July 26, 1955  J. BERRY  2,713,933
LOADING MACHINES
Filed Sept. 9, 1953  5 Sheets-Sheet 1
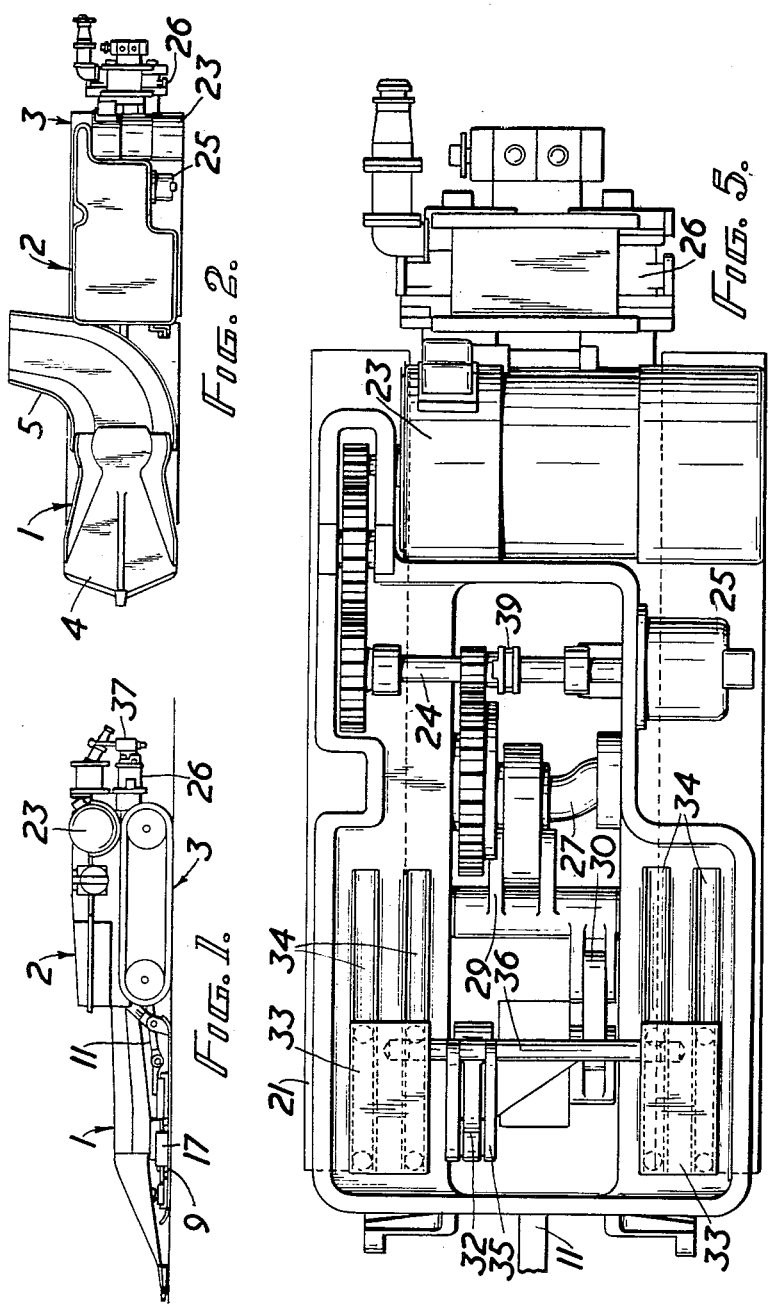
INVENTOR:-
John Berry,
BY
Pierce, Scheffler Parker,
ATTORNEYS.

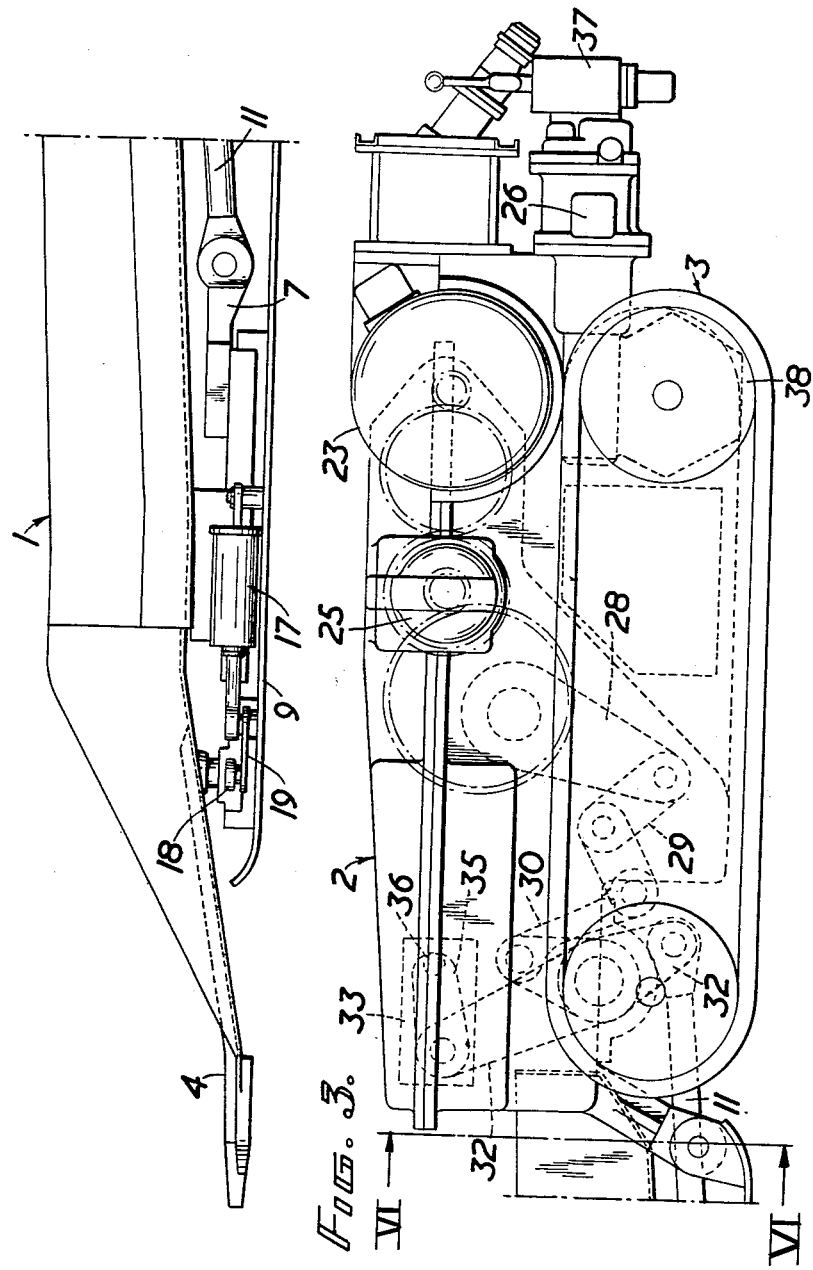

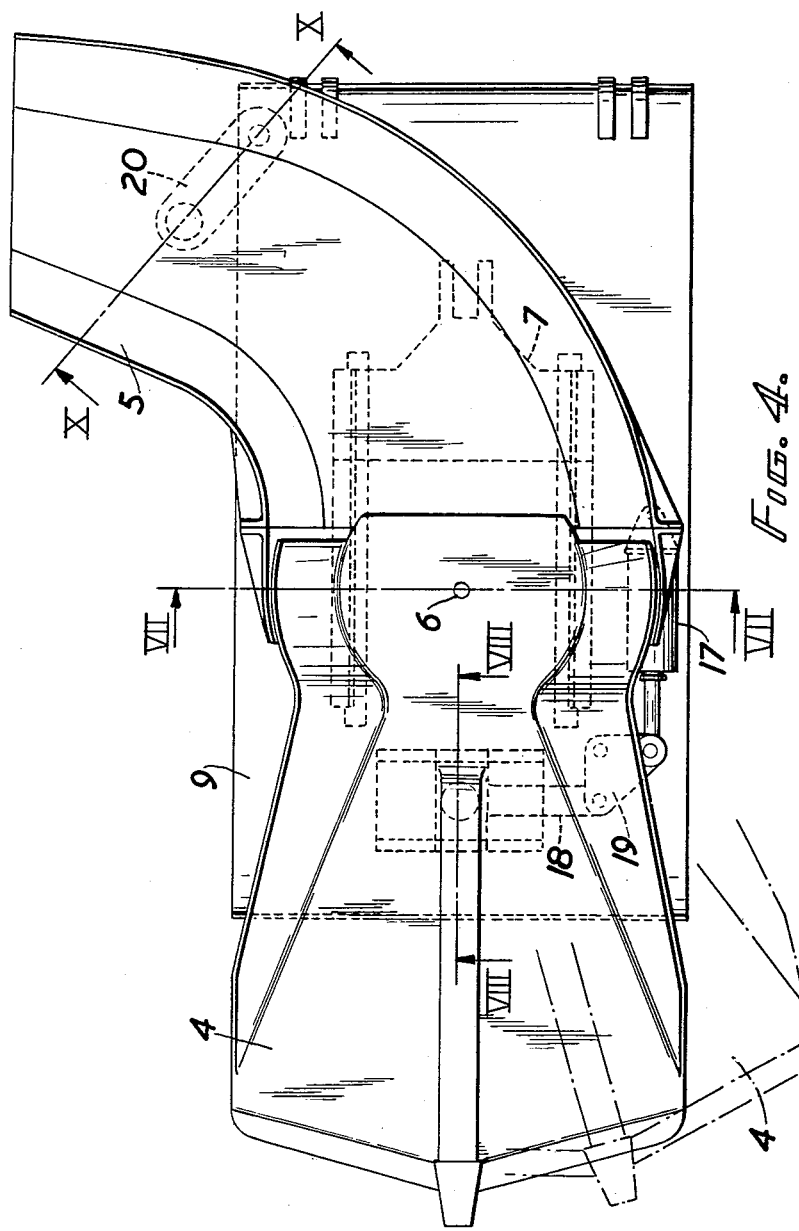

July 26, 1955  J. BERRY  2,713,933
LOADING MACHINES

Filed Sept. 9, 1953  5 Sheets-Sheet 5

INVENTOR:-
John Berry,
BY Pierce, Scheffler Parker,
ATTORNEYS.

United States Patent Office 2,713,933
Patented July 26, 1955

2,713,933

LOADING MACHINES

John Berry, Morpeth, England

Application September 9, 1953, Serial No. 379,141

Claims priority, application Great Britain September 11, 1952

4 Claims. (Cl. 198—14)

This invention relates to machines for loading coal or other loose material and provides a new or improved mobile machine for this purpose, in which the material is picked up by a shovel attached to a shaker conveyor.

Shaker conveyors fitted with duckbill loading heads are already widely used underground as self loading conveyors, but while in use these conveyors are statically mounted, their driving mechanism being firmly anchored to the floor, and penetration of the shovel into the pile of material is effected by extension of the loading head.

The principle of picking up material by means of a shovel attached to a shaker conveyor has also been applied, or proposed for application, to loading machines adapted to travel along rail tracks and intended for use in mine tunnel work. In these machines the shaker conveyor extended upwardly and rearwardly over the top of its driving mechanism and discharged behind the latter into an elevating conveyor, disposed in tandem with the shovel trough and forming an integral part of the loading machine, the latter conveyor raising the material to the height required for discharge into mine cars. Since the slope of a shaker conveyor must be kept slight, the efficiency falling off rapidly with increasing up hill gradient, a loading machine of this character is necessarily very long, the total length of the shovel and of the troughing behind it being perhaps 50 feet, in addition to the length of the elevating conveyor. The machines are consequently of limited application.

The loading machine of the present invention, in the form at present preferred is provided with steerable propelling means, operating independently of rail tracks, which render the machine fully mobile and serve to thrust the shovel into the pile of material to be loaded, the shovel and shaker conveyor being of inextensible construction. By comparison with the known loading machines above described, the length of the machine is quite small, the shaker conveyor being disposed wholly in front of its driving mechanism and serving to discharge the coal or other material at a height less than the height of the drive mechanism. The shaker conveyor is curved in plan and discharges the material clear of the machine to one side thereof.

In this form, the machine of the invention is primarily intended for loading at the face coal which has been mined by longwall methods, where it is usual to have a low conveyor running close to and parallel with the face. The machine travels between the conveyor and the face, picking up coal prepared for loading and depositing it onto the conveyor. For this purpose, discharge from the side of the machine is clearly essential, but for other applications of the machine the discharge of the shaker conveyor may be arranged otherwise; it may, for example, deliver the material into an elevating conveyor mounted on and forming part of the loading machine.

A particular form of the machine of the invention will now be described by way of example with reference to the accompanying drawings, wherein:

Figure 1 is a side elevation in outline of the complete machine;

Figure 2 is a plan view of Figure 1;

Figure 3 is a side elevation on a larger scale, showing the shaker conveyor and its drive mechanism separately, whilst Figure 4 is a plan view of the conveyor in Figure 3; and Figure 5 is a plan view of the drive mechanism in Figure 3 with the top cover plate removed;

The same reference numerals are used to indicate the same parts throughout.

The machine has an overall length of some 15 feet and has at its forward end a shaker conveyor denoted generally by 1 in Figure 1, of length about 8 feet, while the remainder of the machine is occupied by the drive mechanism (denoted generally by 2) for the conveyor on which are mounted caterpillar tracks 3 for propelling the machine as a whole.

Figure 7:
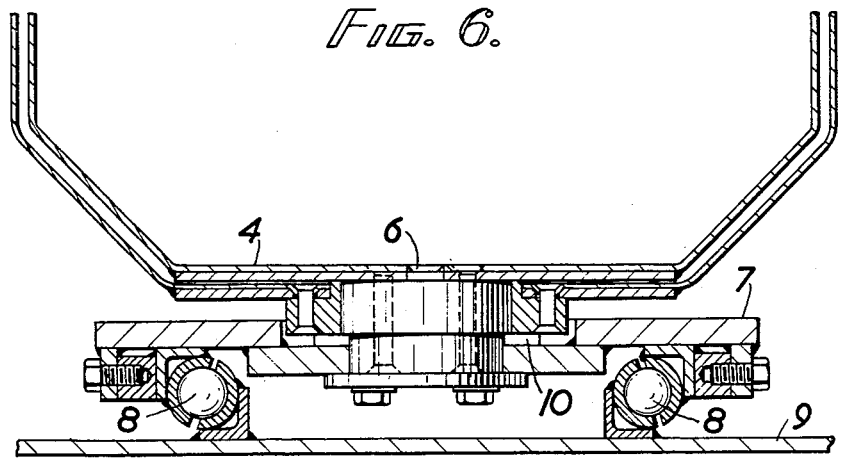
Figure 7 is a section on line VII—VII of Figure 4.

The conveyor comprises a duckbill shovel 4, of well known design, and a discharge trough 5 curved as shown in Figure 4. From the rear end of the shovel, coal or other material picked up passes into the trough 5 which deflects the material through approximately a right angle and discharges it clear of the machine and to one side thereof. The shaker conveyor formed by the shovel and angle trough slopes to the rear and upwards at only a small angle, the discharge height being less than the height of the drive mechanism 2 (Figure 1) and only about 7½" to 9" in the machine here described. The shovel 4 has a length of some 4 feet and a maximum width of 3 feet 6 inches. Both the shovel and the discharge trough are articulately mounted on a vertical pivot pin 6 which allows the shovel to be swung through an angle of some 15° on each side of the fore and after centre line of the machine so that it can be used to pick up material to either side of that which lies directly ahead of the machine. If desired, however, the shovel and the trough may be formed integrally. The pivot 6 (Figure 7) is mounted in a frame or saddle 7 which is slidable longitudinally of the machine on ball bearings 8 carried by a skid plate 9 which rests on the mine floor. A thrust washer 10 is provided between the trough and the frame 7. One central puller rod 11 actuated by the reciprocating mechanism in a manner to be described is pivotally attached to the rear end of the frame.

Figure 8:
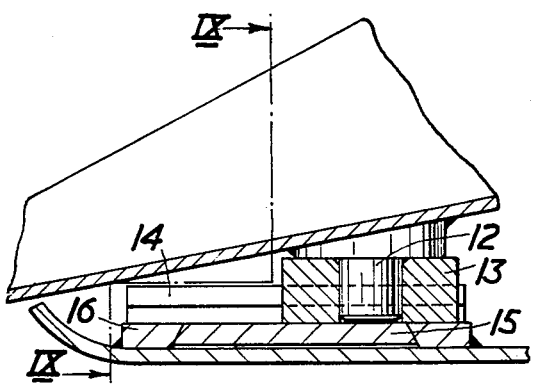
Figure 8 is a section on line VIII—VIII of Figure 4; whilst
Figure 9:
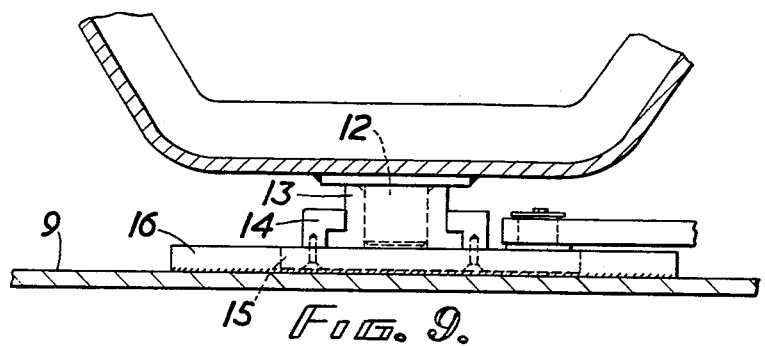
Figure 9 is a section on line IX—IX of Figure 8.

The shovel 4 is also supported forward of the pivot 6 by a sliding shoe arrangement shown best in Figures 8 and 9; this arrangement supports the shovel, whilst enabling it to be both reciprocated longitudinally, and swivelled about pivot 6. A pivot pin 12 fixed to the underside of the shovel is mounted for rotation in a carriage 13, the lower edges of which are flanged outwardly (Figure 9). These flanges engage beneath longitudinal guide rails 14, which thus serve to direct the shovel for longitudinal reciprocal movement. The rails 14 are in turn screwed to a shoe 15 which is dovetailed into a lateral groove formed in guide plates 16, and is slidable in this groove. Plates 16 are fixed to the skid plate 9. The swivelling movement of the shovel is effected by means of a double acting hydraulic jack cylinder 17, which is connected to plate 15 by means of links 18 and 19 (Figures 4 and 9). It will be understood, however, that other power or hand operated means may be employed for swivelling the shovel while (for some applications at least of the machine) provision for swivelling movement of the shovel may be omitted the width of the shovel being then preferably increased.

Figure 10:
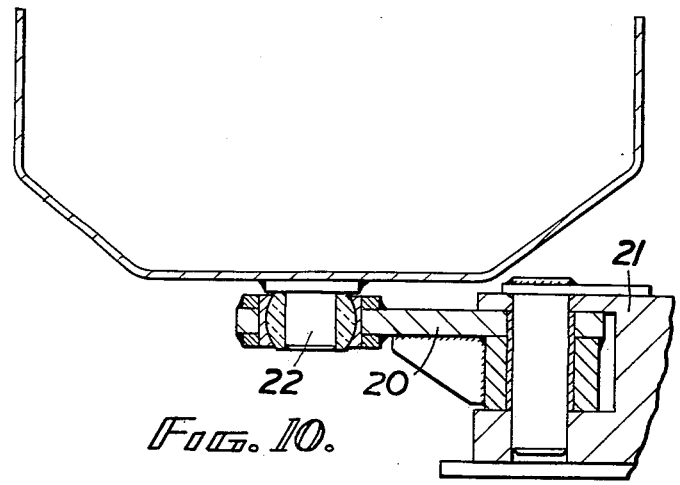
Figure 10 is a section on line X—X of Figure 4.

The discharge trough is supported near its discharge or rear end by link 20 (Figures 4 and 10) which is pivoted at one end to the frame 21 of the driving mechanism 2, whilst its other end is pivoted to pin 22 extending downwardly from the underside of the trough. The respective positions of the trough and the link 20 at each end of the stroke of the conveyor are shown in Figure 3.

The drive mechanism is similar in certain fundamental principles to that employed in statically mounted shaker conveyors manufactured in Great Britain by the applicant company. In the machine herein described the drive is transmitted from an electric motor 23 (to which power is supplied by a trailing cable) to an intermediate shaft 24 through a suitable gear train. Shaft 24 drives a hydraulic pump 25 which supplies fluid to a pair of hydraulic variable speed motors 26 and also to the hydraulic cylinder 17. The reciprocating mechanism for the conveyor is driven mechanically, also from shaft 24, the drive being transmitted through crank shaft 27, connecting rod 28, a bell crank lever 29, coupling rod 30, rocker shaft 31, and lever 32, to the central puller rod 11. This mechanism transmits reciprocating motion to the conveyor as follows: From the start of the loading (i. e. rearward) stroke, the conveyor, together with the material which it has picked up, is accelerated and reaches a maximum velocity at the end of the stroke. At the point of reversal of direction there is an extreme deceleration of the loading unit, allowing the material to remain static in relation to the ground whilst the shovel and trough return to the start of the loading stroke. This action imposes a heavy out-of-balance reciprocating load upon the drive unit, which in static coal face installations is resisted by jacking the drive unit down by four screw or hydraulic jacks.

Figure 6:
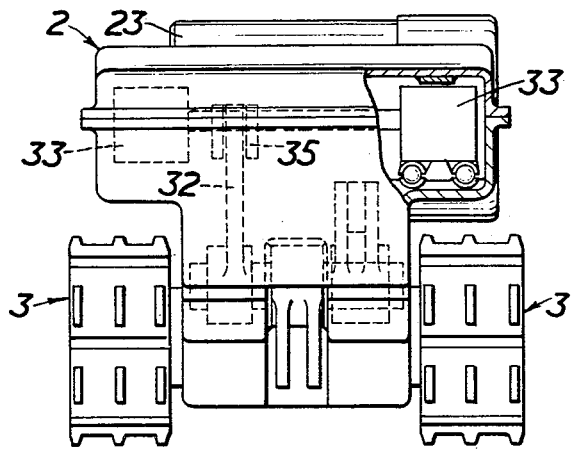
Figure 6 is an end elevation of the driving mechanism taken on line VI—VI of Figure 3 with a portion cut away.

In the mobile loading machine here described, this out-of-balance reciprocating load has been neutralised by incorporating in the drive mechanism a pair of reciprocating balance masses 33 (Figures 3, 4 and 6). These masses are each slidably mounted on ball bearings supported by horizontal guide rails 34. The rails extend, as shown, along each side of the front portion of the drive mechanism frame 21. As shown in Figure 5, the upper end of lever 32 is connected by means of a knuckle joint to a link 35 which in turn is pivotally connected to cross shaft 36 the ends of which oscillate in the two balance masses 33.

The machine is propelled by the caterpillar tracks 3 mounted directly on the drive mechanism frame 21, so giving a composite construction. These tracks serve to move the machine whenever required and may be independently driven in either direction by hydraulic motors 26. The speeds of these motors which operate the tracks through two worm reduction units 38, are infinitely variable, by manipulation of controls 37, from rest to a maximum of 20 feet/min., so that the machine may be steered, and is generally highly manoeuvrable. The tracks also assist in thrusting the reciprocating shovel into a pile of material to be loaded. A locking mechanism, which may be operated hydraulically, may be incorporated to prevent the caterpillar drive shaft from rotating in a reverse direction when the shovel head encounters resistance to the forward reciprocating motion.

A dog clutch 39 is incorporated in the drive mechanism to enable the shaker conveyor to be isolated while still operating the pump and caterpillar drive mechanism.

Although caterpillar tracks are preferred, mechanical propulsion and steering of the loading machine may, however, be effected by means of wheels or walking feet. Many other variations in the drive of the machine are possible. In particular, the hydraulic members above described may be replaced by a direct electrical drive which may work, for example, in cooperation with solenoid brakes. For work on the surface, an internal combustion engine may be used as a prime mover, whilst for underground work, this may be replaced by an air motor.

I claim:

1. In a loading machine particularly for use in mines, a self propelled steerable vehicle, a ground supported skid plate disposed in front of said vehicle and coupled thereto, a saddle supported on said skid plate and guided for longitudinal sliding movement thereon, a duckbill shovel supported on said saddle for swivelling movement about a vertical pivot, said shovel extending downwardly and forwardly from said pivot to beyond the forward end of said skid plate, laterally extending guides secured to said skid plate at a position forward of said saddle, a shoe slidable in said guides and carrying longitudinally extending guide rails, a carriage slidable in said guide rails and pivotally connected to said shovel, a hydraulic jack mounted on said skid plate and coupled to said shoe for displacing it along said laterally extending guides, an angle trough supported on said saddle and adapted to receive material from said shovel and to discharge it laterally at a position in front of said vehicle and below the level of the top of the vehicle, a shaker drive mechanism mounted on said vehicle for imparting fore and aft movement to said saddle, shovel and angle trough, and balance means associated with said shaker drive mechanism for neutralising the out of balance reciprocating load on the machine.

2. In a loading machine particularly for use in mines a self propelled steerable vehicle, a ground supported skid plate disposed in front of said vehicle and coupled thereto, a saddle supported on said skid plate and guided for longitudinal sliding movement thereon, a duckbill shovel supported on said saddle, said shovel extending dawnwardly and forwardly from said pivot to beyond the forward end of said skid plate, an angle trough supported on said saddle and adapted to receive material from said shovel and to discharge it laterally at a position in front of said vehicle and below the level of the top of the vehicle, a shaker drive mechanism mounted on said vehicle for imparting fore and aft movement of said saddle, shovel and angle trough, an electric motor for operating said drive mechanism, a variable speed hydraulic motor for propelling said vehicle and means for controlling said hydraulic motor, a hydraulic pump operated by said electric motor for supplying fluid to said hydraulic motor, horizontal rails mounted on said vehicle, and a balance mass supported for sliding movement on said horizontal rails, said balance mass being connected to said drive mechanism whereby to neutralise the out-of-balance load on the machine consequent upon the extreme deceleration of the saddle, shovel and angle trough at the rearmost end of the stroke thereof.

3. In a loading machine particularly for use in mines, a self propelled vehicle including a pair of individually controllable endless tracks and a frame mounted thereon, a ground supported skid plate disposed in front of said vehicle and coupled thereto, a saddle supported on said skid plate and guided for longitudinal sliding movement thereon, a duckbill shovel supported on said saddle for swivelling movement about a vertical pivot, said shovel extending downwardly and forwardly from said pivot to beyond the forward end of said skid plate, laterally and longitudinally slidable shovel support means mounted on said skid plate at a position forward of said saddle, a hydraulic jack mounted on said skid plate and coupled to said shovel support means for swivelling said shovel about said vertical pivot, an angle trough supported on said saddle for swivelling movement about said pivot and adapted to receive material from said shovel and to discharge it laterally at a position in front of said vehicle and below the level of the top of the vehicle, a shaker drive mechanism mounted on said vehicle, an operating rod connecting said drive mechanism with said saddle whereby the drive mechanism can impart a fore and aft reciprocating movement to said saddle, shovel and angle trough, a prime mover for operating said drive mechanism, a pair of variable speed hydraulic motors for driving said endless tracks and means for controlling the speed of said motors, a hydraulic pump operated by said prime mover for supplying fluid to said hydraulic motors and also to said hydraulic jack, horizontal rails mounted on said vehicle, and a balance mass supported for sliding movement on said horizontal rails, said balance mass being connected to said drive mechanism whereby to neutralise the out-of-balance load on the machine consequent upon the extreme deceleration of the saddle, shovel and angle trough at the rearmost end of the stroke thereof.

4. In a loading machine particularly for use in mines, a self propelled steerable vehicle, a ground supported skid plate disposed in front of said vehicle and coupled thereto, a saddle supported on said skid plate and guided for longitudinal sliding movement thereon, a vertical pivot upstanding from said saddle, a duckbill shovel supported on said saddle for swivelling movement about said vertical pivot to either side of the longitudinal centre line of the machine, said shovel extending downwardly and forwardly from said pivot to beyond the forward end of said skid plate, laterally extending guides secured to said skid plate at a position forward of said saddle, a shoe slidable in said guides and carrying longitudinally extending guide rails, a carriage slidable in said guide rails and pivotally connected to said shovel, a hydraulic jack mounted on said skid plate and coupled to said shoe for displacing it along said laterally extending guides, an angle trough supported on said saddle and adapted to receive material from said shovel and to discharge it laterally at a position in front of said vehicle and below the level of the top of the vehicle, a supporting link pivotally connected to said angle trough and to the vehicle, a shaker drive mechanism mounted on said vehicle, an operating rod connecting said drive mechanism with said saddle whereby the drive mechanism can impart a fore and aft reciprocating movement to said saddle, shovel and angle trough, a prime mover mounted on said vehicle for operating said drive mechanism, drive means for propelling said vehicle and operating means for said hydraulic jack, clutch means operable to engage and disengage said drive means and operating means, from said prime mover and balance means associated with said shaker drive mechanism for neutralising the out of balance reciprocating load on the machine.

References Cited in the file of this patent

UNITED STATES PATENTS

| 708,616 | Bearman | Sept. 9, 1902 |
| 1,945,119 | Metcalf | Jan. 30, 1934 |
| 2,332,176 | Sloane | Oct. 19, 1943 |
| 2,587,229 | Sabes | Feb. 26, 1952 |

FOREIGN PATENTS

| 474,131 | Germany | Mar. 26, 1929 |
| 549,589 | Great Britain | Nov. 27, 1942 |